United States Patent [19]

Hagyuda

[11] Patent Number: 4,561,751
[45] Date of Patent: Dec. 31, 1985

[54] FLASH DEVICE

[75] Inventor: Nobuyoshi Hagyuda, Kawasaki, Japan

[73] Assignee: Nippon Kogaku K.K., Tokyo, Japan

[21] Appl. No.: 593,703

[22] Filed: Mar. 26, 1984

[30] Foreign Application Priority Data

Mar. 31, 1983 [JP] Japan ................................. 58-53492

[51] Int. Cl.⁴ ............................................. G03B 15/03
[52] U.S. Cl. .................................... 354/418; 354/424; 354/132
[58] Field of Search .................. 354/418, 424, 132

[56] References Cited

U.S. PATENT DOCUMENTS

| 3,980,923 | 9/1976 | Schneider | 354/132 |
| 4,384,238 | 5/1983 | Greenwald et al. | 354/132 |
| 4,415,247 | 11/1983 | Takematsu | 354/132 |
| 4,457,602 | 7/1984 | Mizokami | 354/132 |

Primary Examiner—Russell E. Adams
Attorney, Agent, or Firm—Fitzpatrick, Cella, Harper & Scinto

[57] ABSTRACT

An electronic flash device of a camera comprises first flash means for emitting a flashlight, second flash means for emitting a flashlight, means for detecting that the first flash means has started to emit a flashlight and for producing a detection signal, and means responsive to the detection signal to cause the second flash means to start to emit a flashlight.

14 Claims, 4 Drawing Figures

FLASH DEVICE

BACKGROUND OF THE INVENTION

This invention relates to a flash device having two or more light-emitting tubes.

There is conceivable a flash device which is provided with two light-emitting tubes one of which causes light to bounce and be applied to an object to be photographed and the other of which applies direct light to the object to be photographed. As a method for controlling the two light-emitting tubes of such a flash device, there may be supposed, for example, a system of the type in which the two light-emitting tubes are series-connected to a main capacitor. This system is considered to have a disadvantage in that the light-emitting efficiency is remarkably reduced or the impedance of the light-emitting tubes is increased and therefore the light emission time is lengthened and is out of synchronization with the camera.

SUMMARY OF THE INVENTION

It is an object of the present invention to provide a flash device which has good light-emitting efficiency, which is easy to be synchronized with a camera and which has two or more light-emitting tubes.

In the present invention, the light emission triggers of at least one main light-emitting tube chiefly for emitting much of light emission energy and at least one auxiliary light-emitting tube which can only emit less light energy than the light emission energy of the main light-emitting tube are distinguished in terms of time so that the auxiliary light-emitting tube is caused to emit light only when the main light-emitting tube emits light.

The invention will become more fully apparent from the following detailed description thereof taken in conjunction with the accompanying drawings.

DESCRIPTION OF THE PREFERRED EMBODIMENTS

Figure 1:
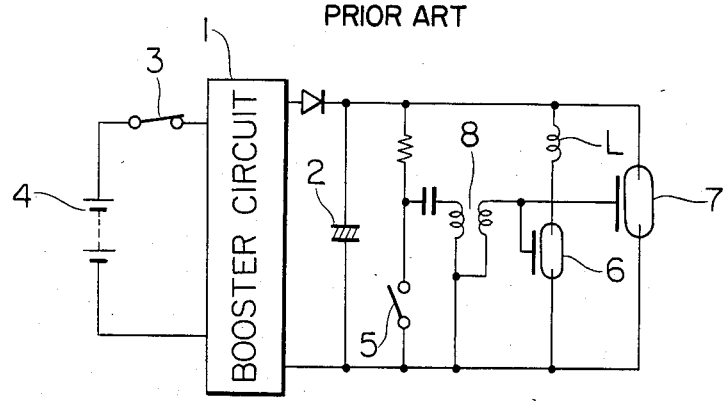
FIG. 1 is a circuit diagram showing an example of the prior art to explain the present invention.

FIG. 1 diagrammatically shows a circuit comprising a main switch 3 series-connected to a power source 4, a booster circuit 1, a main capacitor 2 for charging a charge for light emission, a trigger coil 8 triggering a main light-emitting tube 7 and an auxiliary light-emitting tube 6, an X contact 5 and an inductor L series-connected to the auxiliary light-emitting tube 6. FIG. 1 is a diagram for illustrating the principle of the present invention, and shows a system in which respective light-emitting tubes are parallel-connected to a main capacitor. In the case of this system, the minimum possible light emission voltages of the respective light-emitting tubes are peculiar and when light-emission trigger is applied in a condition in which the charging of the main capacitor is insufficient, the two light-emitting tubes do not emit light but only one of them emits light. Usually, one of the two light-emitting tubes has a small guide number, and this system aims at the catch light or the like when photography is effected with bounce light emission being effected by the use of the other light-emitting tube having a great guide number. This catch light means a light directly applied to the eyes of a person which is an object to be photographed, in contrast with the light emitted by bounce. Accordingly, when a current produced by light emission (hereinafter referred to as the light emission current) flows only to the light-emitting tube having a small guide number, there is a danger of that light-emitting tube being destroyed. Also, if only one of the two light-emitting tubes emits light, the user can confirm that the object to be photographed has been illuminated, but even if the illumination by the light emission of only one of the two light-emitting tubes is insufficient and proper exposure cannot be obtained, the user cannot confirm it at all.

Figure 2:
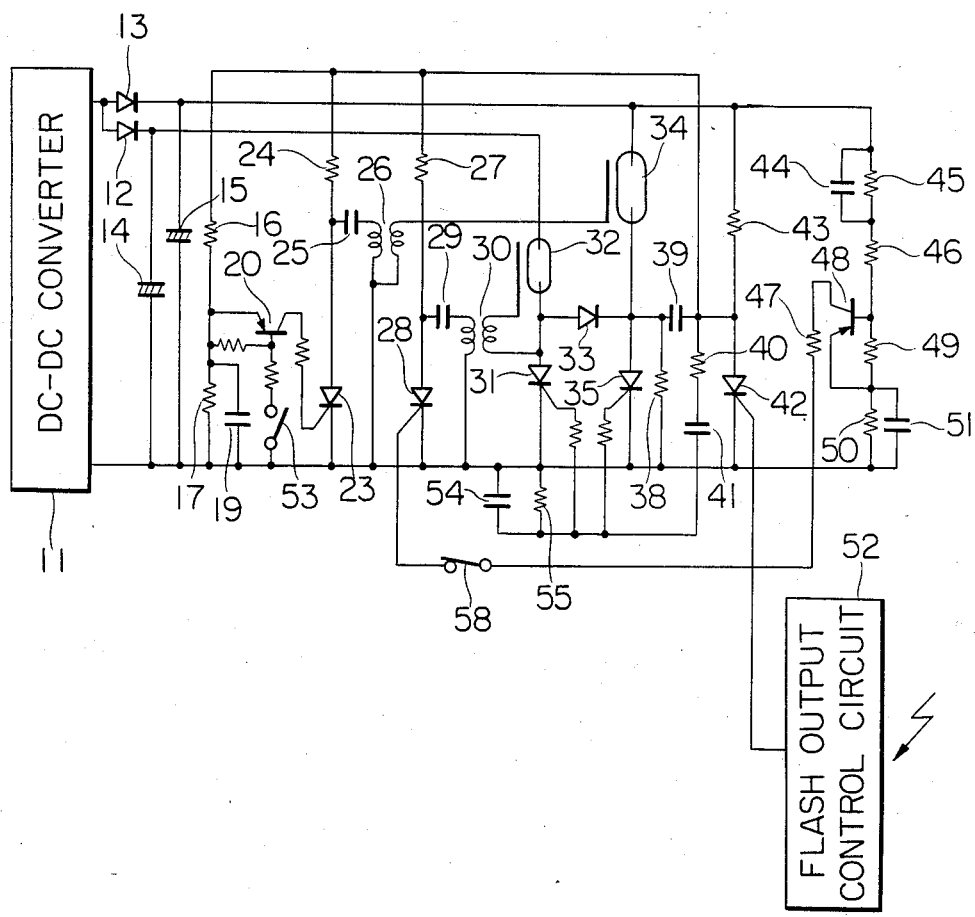
FIG. 2 is a circuit diagram of a first embodiment of the present invention.

FIG. 2 shows an embodiment of the present invention. Reference numeral 11 designates a DC-DC converter portion including the power source 4, the switch 3 and the booster circuit 1 in FIG. 1, and reference numeral 34 denotes a main light-emitting tube whose guide number is greater than that of an auxiliary light-emitting tube 32. There are main capacitors 15 and 14 as the current supply sources for the respective light-emitting tubes 34 and 32. Designated by 53 is the X contact of a camera which is adapted to be closed in synchronism with shutter release. Block 52 is a conventional flash output control circuit which may integrate the reflected light from an object to be photographed and, when the quantity of the reflected light reaches a predetermined value, the flash output control circuit supplies a light emission stopping signal to the gate of a thyristor 42 to stop light emission. When the main switch is first closed, the DC-DC converter 11 starts to operate and boosts the voltage of the power source, and charges the main capacitors 14 and 15 to a predetermined voltage through diodes 12 and 13, respectively. At the same time, a capacitor 19 is charged to a voltage divided by resistors 43, 16 and 17 and provides the power source of a first trigger circuit comprising a resistor, a capacitor 25, a trigger coil 26 and a thyristor 23. A capacitor 51 is charged to a voltage divided by resistors 45, 46, 49 and 50 and provides the power source of a second trigger circuit. The second trigger circuit comprises a resistor 27, a capacitor 29, a trigger coil 30 and a thyristor 28. Also, a commutation capacitor 39 is charged in the order of a resistor 43, a capacitor 39 and a resistor 38. The trigger capacitor 25 of the first trigger circuit and the trigger capacitor 29 of the second trigger circuit are charged through resistors 24 and 27, respectively. Thyristors 31 and 35 are connected to the cathodes of the respective light-emitting tubes 32 and 34 to cause the light-emitting tubes to emit light. A transistor 48 has its collector connected to the gate of the thyristor 28 through a resistor 47 and a switch 58. The second trigger circuit operates when the transistor 48 conducts. The switch 58 controls the light emission of the auxiliary light-emitting tube 32.

When the camera is released, the X contact 53 of the camera is closed and transistor 20 conducts. A current flows from the power source capacitor 19 of the first trigger circuit to the gate of thyristor 23, which thus conducts. When the thyristor 23 conducts, a trigger signal is transmitted from the secondary winding of trigger coil 26 in the order of the trigger electrode to the cathode electrode of the main light-emitting tube 34, the commutation capacitor 39, the resistor 40, the capacitor 41, the gates of thyristors 31 and 35, and GND, and the thyristor 35 conducts and the main light-emitting tube 34 starts to emit light. At this time, the trigger signal is not transmitted to the auxiliary light-emitting tube 32 and therefore, this light-emitting tube does not yet start to emit light. When the main light-emitting tube 34 starts to emit light, the voltage of the main capacitor 15 begins to drop. Due to this voltage drop, the base current of transistor 48 flows from capacitor 51 in the order of resistor 46, capacitor 44 and main light-emitting tube 34 and thus, the transistor 48 conducts and a current flows from the power source capacitor 51 of the second trigger circuit in the order of the transistor 48, the resistor 47 and the gate of the thyristor 28, which thus conducts. When the thyristor 28 conducts, the trigger electrode of the auxiliary light-emitting tube 32 is triggered and this light-emitting tube starts to emit light. Since the thyristor 31 has already started to conduct and becomes conductive when the main light-emitting tube 34 is triggered, the auxiliary light-emitting tube 32 is triggered after the main light-emitting tube 34 is triggered and thus, the object to be photographed is illuminated by the illumination of the two light-emitting tubes, and the reflected light therefrom is integrated by the flash output control circuit 52 and, when the reflected light reaches a predetermined quantity of light, the flash output control circuit 52 transmits a light emission stopping signal to the gate of thyristor 42. When the thyristor 42 conducts, the commutation capacitor 39 is discharged and the anode of thyristor 35 assumes a negative voltage and becomes reversely biased and thus, the thyristor 35 becomes non-conductive. Likewise, the anode of thyristor 31 also assumes a negative voltage through diode 33 and becomes reversely biased and thus, the thyristor 31 becomes non-conductive. That is, the commutation circuits of the thyristors 31 and 35 are used in common. When the thyristors 31 and 35 become non-conductive, the two light-emitting tubes stop emitting light.

If the charging voltage of the main capacitor 15 is insufficient and the main light-emitting tube 34 does not emit light in spite of the X contact having been closed, transistor 48 remains non-conductive because there is no voltage drop of the main capacitor 15. Accordingly, the second trigger circuit does not operate and the auxiliary light-emitting tube 32 does not emit light. Capacitor 54 and resistor 55 serves to prevent malfunctioning of the thyristors 31 and 35, and capacitor 54 also serves to reliably maintain the thyristor 31 conductive from the operation of the first trigger circuit until the operation of the second trigger circuit is started. Further, by opening the switch 58, it is possible to prevent the auxiliary light-emitting tube from emitting light.

Figure 3:
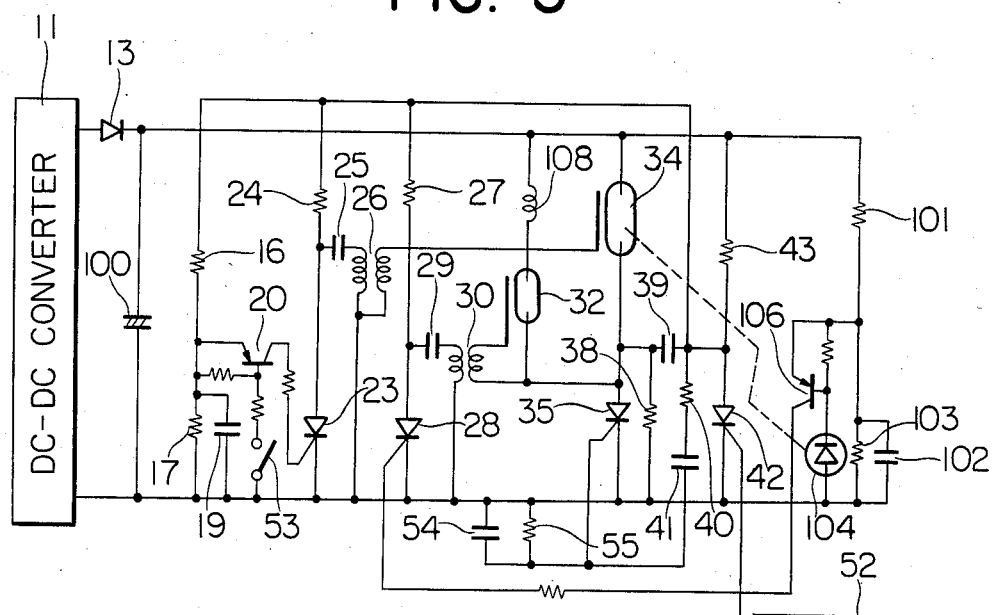
FIG. 3 is a circuit diagram of a second embodiment of the present invention.

FIG. 3 shows another embodiment of the present invention which optically detects the light emission of the main light-emitting tube. In FIG. 3, members given reference numerals similar to those in FIG. 2 need not be described. A main capacitor 100 is used in common for the main light-emitting tube 34 and the auxiliary light-emitting tube 32. For the purpose of preventing a current from concentrating in the auxiliary light-emitting tube 32, an inductor 108 as an impedance element is series-connected to the auxiliary light-emitting tube 32. At a point of time whereat the charging of the main capacitor 100 is completed, a capacitor 102 is charged with a voltage divided by resistors 101 and 103. A light-receiving element 104 is disposed near the main light-emitting tube 34 and, when the main light-emitting tube starts to emit light, the light-receiving element 104 directly receives the light and the photocurrent thereof flows as the base current of a transistor 106 and therefore, the transistor 106 conducts and the thyristor 28 conducts, and the second trigger circuit operates and the auxiliary light-emitting tube 32 starts to emit light. Also, the light emission currents of the two light-emitting tubes flow to a single thyristor 35 and therefore, there is not provided the thyristor 31 of FIG. 2.

Figure 4:
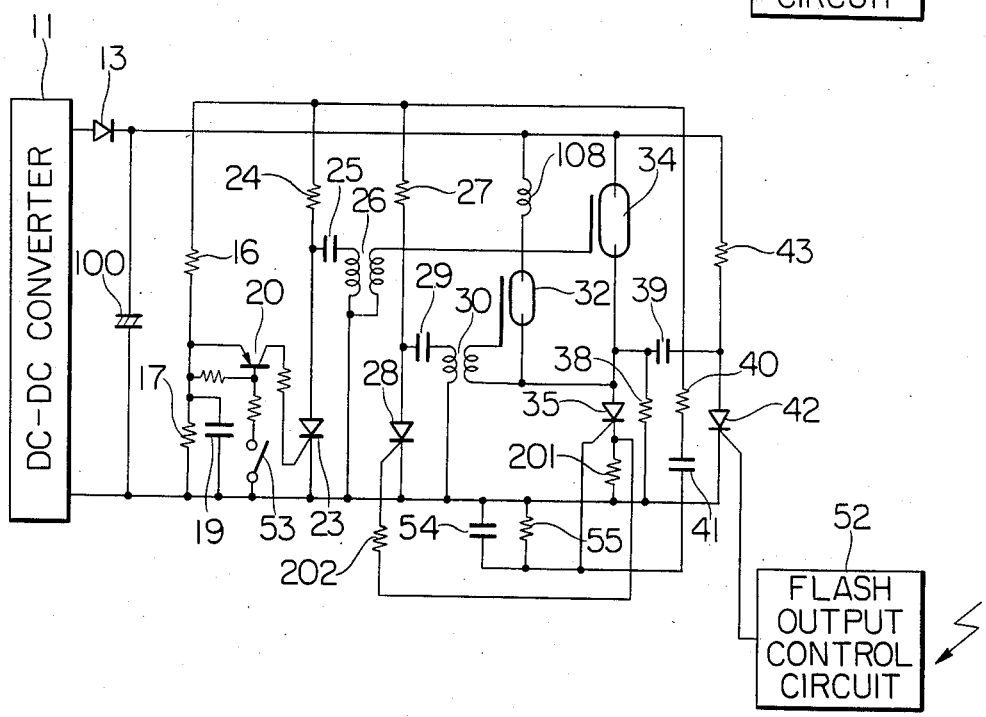
FIG. 4 is a circuit diagram of a third embodiment of the present invention.

FIG. 4 shows still another embodiment of the present invention which detects the light emission of the main light-emitting tube by the light emission current. In FIG. 4, members given reference numerals similar to those in FIGS. 2 and 3 need not be described. In FIG. 4, a resistor 201 is a resistor of relatively small resistance value using a Manganin wire or the like and, when the main light-emitting tube 34 starts to emit light, a voltage produced in the resistor 201 by the light emission current operates the thyristor 28 of the second trigger circuit through a resistor 202.

According to the present invention, when the main light-emitting tube cannot emit light, the auxiliary light-emitting tube does not emit light and the user can readily know that charging is insufficient. Where the main light-emitting tube is used for the light emission by bounce and the auxiliary light-emitting tube is used for the light emission by catch light, particularly where the charge once charged in the main capacitor is continuously discharged little by little at short time intervals to divisionally emit light (for example, in the case of the continuous photography by a camera driven by a motor drive), if only the auxiliary light-emitting tube emits light in the construction as shown in FIG. 1, the user may misconceive, by observing the light emission, and believe that proper exposure has been attained. The present invention gives the user no such misconception. Also, if the flash output control circuit 42 is constituted by a constant quantity-of-light generating circuit which causes the flash output to be controlled always by a predetermined guide number, during continuous photography or the like using a camera having a motor drive mounted therein, it will also become possible to inform the user in advance that the energy charged in the main capacitor is divided into several times by the predetermined guide number and photography is continuously possible by a number of frames continuously pre-calculated.

I claim:
1. An electronic flash device of a camera comprising:
   (a) first flash means for emitting a flashlight, said first flash means including a discharge tube for emitting a flashlight and capacitor means for accumulating therein a charge necessary for said discharge tube to emit a flashlight;
   (b) second flash means for emitting a flashlight;
   (c) means for detecting that said first flash means has started to emit a flashlight and for producing a detection signal, said detecting means including means for detecting a voltage produced in accordance with the charge accumulated in said capacitor means; and
   (d) means responsive to said detection signal to cause said second flash means to start to emit a flashlight.
2. An electronic flash device according to claim 1, wherein said voltage detecting means is responsive to the start of the flashlight emission of said first flash means to detect that the voltage produced by said ca- pacitor means has become lower than a predetermined voltage.

3. An electronic flash device according to claim 1, wherein the maximum amount of light emission by said second discharge means is set to be smaller than the maximum amount of light emission by said first discharge means.

4. An electronic flash device according to claim 1, wherein said device includes means for impeding generation of said detection signal.

5. An electronic flash device of a camera comprising:
  (a) first flash means for emitting a flashlight, said first flash means including a discharge tube for emitting a flashlight and capacitor means for accumulating therein a charge necessary for said discharge tube to emit a flashlight;
  (b) second flash means for emitting a flashlight;
  (c) means for detecting that said first flash means has started to emit a flashlight and for producing a detection signal, said detecting means including means for detecting a discharge current produced when said capacitor means discharges through said discharge tube; and
  (d) means responsive to said detection signal to cause said second flash means to start to emit a flashlight.

6. An electronic flash device according to claim 5, wherein the maximum amount of light emission by said second discharge means is set to be smaller than the maximum amount of light emission by said first discharge means.

7. An electronic flash device according to claim 5, wherein said device includes means for impeding generation of said detection signal.

8. An electronic flash device for emitting light to an object comprising:
  (a) a first discharge tube for emitting a flash light to the object;
  (b) a second discharge tube for emitting a flash light to the object;
  (c) an operating member to be operated for energizing the first discharge tube;
  (d) means for flowing an electric current to the first discharge tube in response to said operating member operated;
  (e) means for detecting that the electric current flows to said first discharge tube and generating a detection signal; and
  (f) means for starting light emission of said second discharge tube in response to said detection signal.

9. An electronic flash device for emitting light to an object comprising:
  (a) a first discharge tube for emitting a flash light to the object;
  (b) a second discharge tube for emitting a flash light to the object, the maximum amount of the flash light emitted by the second discharge tube being so set to be smaller than the maximum amount of the flash light emitted by the first discharge tube; and
  (c) means for controlling said second control tube so that said second discharge tube may emit the flash light after said first discharge tube has started emitting the flash light, the control means including detection means for detecting that said first discharge tube has started emitting the flash light and generating a detection signal and means for starting emission of the flash light by the second discharge tube in response to the detection signal.

10. An electronic flash device according to claim 9, wherein said device further comprising a capacitor for storing electric charge necessary for said first and second discharge tubes to effect the respective light emissions.

11. An electronic flash device according to claim 9, wherein said control means includes means for impeding generation of said detection signal.

12. An electronic flash device for a camera comprising:
  (a) a first discharge means for emitting a flash light;
  (b) a second discharge means for emitting a flash light;
  (c) a first switching element connected in series with said first discharge tube and having a conductive state and a non-conductive state, the first switching element forming at least a portion of a loop for discharging the first discharging means when said first switching element is in the conductive state;
  (d) a second switching element connected in series with said second discharge tube and having a conductive state and a non-conductive state, the second switching element forming at least a portion of a loop for discharging the second discharge tube when said second switching element is in the conductive state;
  (e) means for generating a first trigger signal for initiating a flash light emission by the first discharge means, said first and second switching element becoming conductive in response to said first trigger signal;
  (f) means for detecting that the first discharge tube has started emitting the flash light and generates a detection signal; and
  (g) means for generating a second trigger signal for starting a flash light emission by the second discharge tube in response to said detection signal.

13. An electronic flash device according to claim 12, wherein said first switching element includes a thyristor.

14. An electronic flash device according to claim 12, wherein said second switching element includes a thyrister.

* * * * *

UNITED STATES PATENT AND TRADEMARK OFFICE
CERTIFICATE OF CORRECTION

PATENT NO. : 4,561,751
DATED : December 31, 1985
INVENTOR(S) : NOBUYOSHI HAGYUDA It is certified that error appears in the above-identified patent and that said Letters Patent is hereby corrected as shown below:

Claim 9, line 10 (Column 6, line 3) change "control" to --discharge--.

Signed and Sealed this

Twenty-second Day of April 1986

[SEAL]

Attest:

DONALD J. QUIGG

Attesting Officer

Commissioner of Patents and Trademarks